(12) United States Patent
Kloczko et al.

(10) Patent No.: US 6,505,434 B1
(45) Date of Patent: Jan. 14, 2003

(54) DEVICE FOR LURING AND CATCHING INSECTS

(75) Inventors: Malgorzata Kloczko, Linz; Michael Roreger, Neuwied, both of (DE)

(73) Assignee: LTS Lohmann Therapie-Systeme AG, Neuwied (DE)

( * ) Notice: Subject to any disclaimer, the term of this patent is extended or adjusted under 35 U.S.C. 154(b) by 0 days.

(21) Appl. No.: 09/601,141

(22) PCT Filed: Jan. 7, 1999

(86) PCT No.: PCT/EP99/00053

§ 371 (c)(1),
(2), (4) Date: Aug. 30, 2000

(87) PCT Pub. No.: WO99/37146

PCT Pub. Date: Jul. 29, 1999

(30) Foreign Application Priority Data

Jan. 26, 1998 (DE) .......................... 198 02 750

(51) Int. Cl.[7] .......................... A01M 1/14; A01N 25/00
(52) U.S. Cl. .......................... 43/114; 424/405; 424/416
(58) Field of Search .......................... 43/114, 115, 116; 424/405, 407, 406, 416; 119/654

(56) References Cited

U.S. PATENT DOCUMENTS

| 3,428,221 | A |   | 2/1969  | Landsman et al. |       |
|-----------|---|---|---------|-----------------|-------|
| 4,073,946 | A | * | 2/1978  | Bayless .......................... | 426/2 |
| 4,156,321 | A | * | 5/1979  | Capizzi et al. ................ | 43/114 |
| 4,243,660 | A | * | 1/1981  | Szantay et al. ............... | 424/84 |
| 4,532,123 | A |   | 7/1985  | Gardner         |       |
| 4,656,032 | A | * | 4/1987  | Arsura et al. .................. | 424/84 |
| 4,992,268 | A |   | 2/1991  | Landolt et al. ................ | 424/77 |
| 5,031,354 | A | * | 7/1991  | Olson .......................... | 43/114 |
| 5,258,176 | A |   | 11/1993 | Keenan ........................ | 424/84 |
| 5,306,499 | A | * | 4/1994  | Ohtsubo et al. ............. | 424/405 |
| 5,503,839 | A | * | 4/1996  | Saguchi et al. ............. | 424/408 |
| 5,572,825 | A | * | 11/1996 | Gehret .......................... | 43/114 |
| 5,634,293 | A | * | 6/1997  | Mike et al. .................... | 43/136 |
| 5,649,685 | A | * | 7/1997  | Acevedo ........................ | 43/114 |
| 5,780,389 | A | * | 7/1998  | Krause et al. ............... | 504/359 |
| 6,080,418 | A | * | 6/2000  | Sengupta et al. ........... | 424/408 |

FOREIGN PATENT DOCUMENTS

| DE | 399417     | 8/1924  |
|----|------------|---------|
| DE | 29513049   | 11/1995 |
| DE | 196 09544 A | 9/1996 |
| DE | 19515186   | 10/1996 |
| FR | 2468305 A  | 5/1981  |
| JP | 53 142532 A | 12/1978 |
| JP | 54028825   | 3/1979  |
| JP | 04 300804 A | 10/1992 |
| WO | WO 87/04591 | 8/1987  |
| WO | WO 96/26642 | 9/1996  |
| WO | WO 97/01272 | 1/1997  |

* cited by examiner

Primary Examiner—Charles T. Jordan
Assistant Examiner—John W. Zerr
(74) Attorney, Agent, or Firm—Jordan and Hamburg LLP

(57) ABSTRACT

An adhesive insect trap with a carrier layer, an attractant-containing pressure-sensitive adhesive layer suitable for trapping insects, and a protective layer contains attractant-loaded microparticles in the pressure-sensitive adhesive layer.

16 Claims, No Drawings

DEVICE FOR LURING AND CATCHING INSECTS

The present invention relates to an adhesive insect trap in the form of a one-piece, attractant-containing arrangement for attracting insects with attractants and trapping the thus attracted insects by means of a pressure-sensitive adhesive surface. Furthermore, the invention relates to a process for the production and use of the arrangement.

Arrangements for attracting and trapping insects with attractant traps are commonly known. They are employed as an important means of pest control and are especially used for the early detection of insects and evaluation of the intensity of infestation, i.e. for population monitoring. In addition, they provide the possibility of monitoring the success of chemical pest control measures. Furthermore, they can be applied for total pest eradication in the case low insect population densities, e.g. in private households.

All attractant traps currently used in practice function on the same principle: the volatile attractants are released from the trap to the surroundings and dispersed in the air space. The destructive insects, which are sensitive to even minor attractant stimuli, deliberately go in search of the "odor source". Once they have been attracted, they generally remain stuck to the adhesive surface of the trapping arrangement.

The attractants which are employed are either feeding attractants simulating insect food or so-called pheromones. Pheromones are species-specific aromatic substances produced by the insects themselves for the purpose of communication and can be divided into various pheromone types, including sexual pheromones and aggregation pheromones. Sexual attractants serve the finding of a partner: the sexually mature female, ready to mate, attracts male animals with its scent. Aggregation pheromones, which are, unlike sexual pheromones, produced by both sexes, serve to communicate to members of the same species that the emitter of the pheromones has found a suitable feeding and/or breeding substrate.

Synthetically produced attractants can be processed in various ways for their commercial use in the field of insect monitoring. They can be bound to a polymeric carrier material (rubber, polyethylene, polyvinyl chloride or cellulose derivatives) and placed on the adhesive surface of the trap in the form of a separate baiting agent, e.g. a capsule, or they can be incorporated into the adhesive.

Depending on the type of integration of attractants in an insect trap, the state-of-the-art adhesive insect traps available on the market can be subdivided into three groups, of which a short description will be given in the following:

A Two-component Systems

These are systems which comprise a trap body with a pressure-sensitive adhesive surface (adhesive panel or strip) and a separately packaged attractant baiting agent. The bait is removed from its package before use and attached to the pressure-sensitive adhesive surface.

State-of-the-art baiting agents can have various embodiments, e.g. in the form of capsules, bags or caps, and contain one or more attractants (combination bait). Almost all commercial baiting agents contain sexual pheromones. The pheromone substance is bound to a carrier material and can diffuse unhindered from the material throughout the period of application of the trap.

To prevent the loss of pheromones during storage, the bait is generally packaged in an odorproof material.

In the practice of pest control, the application of such two-component insect trapping arrangements has the following disadvantages—among others—and is accordingly problematic:

As the pheromone substances are only released from the above described bait to the surrounding air by means of diffusion, the release rate is relatively high in the initial phase of application due to the initially high concentration gradient, but it strongly decreases in the course of time. It is not possible to maintain a continuous and constant release of pheromones throughout longer periods of application with these systems.

The content of pheromone active substances in the bait cannot be exactly regulated due to its production process, which comprises thermal steps, and due to the high volatility of the active substances.

The two-component structure necessitates a higher packaging effort because both components, the adhesive layer of the trap body and the pheromone bait, are subject to aging processes and must be protected against environmental influences during storage.

Due to the two-component structure, these traps are relatively complicated to operate, which is significant especially in the case of commercial pest control.

B One-piece Systems with Laminate Structure

To make insect traps more user-friendly especially in their operation, one-piece systems have been developed in the past.

These chiefly comprise the arrangements described in the Japanese patents JP 4-300804 and JP 54-28825. These relate to adhesive insect traps, preferably for application in the monitoring of cockroach infestation, which do not have a separate baiting agent. In the traps described in the above mentioned patent specifications, the attractant is integrated in a polymer layer. The active substance-containing film containing feeding attractants, on the one hand faces the carrier substrate of the trap body and is on the other hand covered with a pressure-sensitive adhesive layer, so that the complete functional unit of the trapping arrangement has a two-layered or multi-layered structure.

The integration of the attracting means into the trapping means of the adhesive panel of the trap avoids the disadvantage of complicated operation, but the problem of a continuous and constant attractant release remains unsolved.

According to the above mentioned documents, the attractants are present in the polymer layer in a dissolved or dispersed state in saturation concentration and successively migrate, controlled by the concentration gradient, first to the adhesive layer and then to the surrounding air. Consequently, this leads to an increasing exhaustion of the attractant layer, which becomes apparent in decreasing active substance release rates. A reliable monitoring throughout the desired period of use is thus not possible either using these arrangements. In addition, the production of these traps is inconvenient because a multi-layered system structure generally necessitates an additional technical effort.

C One-piece Systems with a Monolithic, Attractant-containing Pressure-sensitive Adhesive Layer The release of attractants in insect-trapping arrangements taught e.g. in JP 53142532 is even more disadvantageous.

The systems described in said document are characterized by an attractant-containing monolithic pressure-sensitive adhesive layer which simultaneously functions as attractant dispenser and trapping surface for the insects. The pressure-sensitive adhesive is generally combined with a carrier, e.g. a sheet of plastic, cardboard or paper, on which said adhesive is attached, and with a protective layer to be removed before use.

From the specifications regarding construction and composition of the pressure-sensitive adhesive layer of the above mentioned arrangements it becomes evident that here, as well, that the release of the active components of the attractants is solely regulated by the concentration gradient.

As is known, such attractant-in-adhesive formulations, in which the attractants are present in free form in the polymer layer, are also subject to time-dependent system exhaustion. A constant and continuous release of the active components can not be achieved with these systems, either.

Finally, it can be stated that in all standard state-of-the-art adhesive insect traps, regardless of their structure and method of operation, the attractant is, at the time of use, present only in a concentration which equals the saturation concentration of the matrix. As these arrangements have no special system-internal mechanisms for the release of attractants, they are, according to the laws of diffusion kinetics and as proven in the practice of pest control, unsuited for constant and continuous attractant release.

Based on the above described state of the art, it is the object of the present invention to provide an arrangement for trapping insects which is suited for constant attractant release, continuous throughout longer periods of time, which has good insect-trapping-capacities and which is stable in storage and easy to operate.

This object is surprisingly achieved with an adhesive insect trap according to the characteristics of the main claim, which completely fulfils the above stated requirements. Further embodiments of the adhesive insect trap relevant to the invention are provided for according to the dependent claims.

The object is achieved according to the invention with a one-piece arrangement in which a continuous release is achieved in that the active components, i.e. attractants, are bound to microparticles which are incorporated into the pressure-sensitive adhesive trapping layer.

The term microparticles in the sense of the present invention refers to solid particles with a substantially spheroid form and a size of preferably between 1 and 100 $\mu$m.

The proportion of attractant-loaded particles in the trapping layer can vary within broad margins. As these solid particles constitute a sort of filling material in the adhesive layer, it is important that their concentration does not influence the tackiness of the trapping layer. The preferred proportion of microparticles in the pressure-sensitive adhesive layer is preferably between 0.1 and 10 wt-%, with a substantially homogeneous distribution.

The attractant can either be enclosed in the particles and/or be adsorbed at the surface or in pores of the particles.

If the attractants are bound by means of enclosure in the interior of the particles, the particles are so-called microcapsules. The term microcapsule according to the present invention refers to both actual microcapsules, i.e. microparticles in which an active substance core is surrounded by a polymeric wall, and monolithic microcapsules, so-called microspheres or microspherules in which an active substance is homogeneously distributed in a polymeric matrix.

If the attractants are adsorbed at the surface of the inorganic or organic substances in the arrangement according to the invention, they are embodied as microdispensers in the form of so-called composite particles.

The special advantage of binding attractants to the particulate carrier system is the thus achieved constant attractant release which remains continuous over a longer period of time, e.g. weeks or months. The multitude of small-dimensional particles with an average particle size of preferably only 10 $\mu$m forms a depot in which, due to its high total surface area, very large amounts of active substance can be stored. This enables a considerable increase in the total active substance content of the arrangement according to the invention and thus leads to a longer period of use because a constant supply of the attractant from the microparticles guarantees that the saturation concentration is maintained in the pressure-sensitive adhesive layer.

A further advantage of the adhesive insect trap according to the invention is that the amount of attractant released per unit of time remains constant throughout the total period of release.

This is achieved by adjusting the corresponding attractant release profile, on the one hand from the microparticles and on the other hand from the adhesive layer.

In the arrangement according to the invention, the release of attractants from the particulate carrier system to the pressure-sensitive adhesive layer is, depending on the type of particle used, carried out either through diffusion from the microcapsules or through desorption from the surface of the composite particles.

Regardless of the release mechanism, the parameters of size and amount, qualitative and quantitative composition of the microparticles as well as their attractant content can be used to adjust the desired release profile. These parameters can be technically influenced.

As mentioned above, the particle size of the used. microparticles can vary, preferably between 1 $\mu$m and 100 $\mu$m. A particle size of $\leq 10\ \mu$m is especially preferred. The advantages have been described above.

Especially in the case of microcapsules in which the attractant release is controlled by diffusion, the choice of the carrier, e.g. capsule wall materials or matrix materials in the case of microspherules, is relevant for the release of attractants. The following families can be named as suitable carrier materials for microcapsules:

copolymerizates of methacrylic acid (e.g. Eudragit E® )

homo- and copolymerizates of acrylic acid esters ethylene-acrylic acid ester copolymerizates (e.g. types of LOTRYL®)

ethylcellulose cellulose esters (e.g. cellulose diacetate or cellulose acetate butyrate)

polyvinyl pyrrolidone polyvinyl alcohol polyvinylidene chloride polyester (e.g. polyethylene therephthalate)

polyurethane water-soluble polysaccharides such as alginates (e.g. sodium alginate)

The preferred embodiments of the microparticles of the arrangement according to the present invention are constructed on the basis of polymerizates of acrylic acid alkyl esters such as acrylic acid ethyl ester, acrylic acid isopropyl ester, acrylic acid n-butyl ester, acrylic acid n-hexyl ester or acrylic acid 2-ethylhexyl ester.

Polymerizates of the above acrylic acid esters are characterized by relatively high material absorption and release capacities, which is why they are of special value especially for use as microspherule embedding materials. In addition, due to the high diffusability of the films produced from these materials, they are very well suited as wall materials of the microcapsules. Furthermore, these carrier materials can be processed in various microcapsule production processes such as coacervation or interfacial polymerization.

Ethylcellulose and copolymerizates of methacrylic acid are further especially suited polymeric carrier materials for microparticles of the arrangement according to the invention.

The physical-chemical characteristics of the carrier materials are of decisive importance for the content of active substances therein, which holds especially true in the case of monolithic microcapsules. The degree to which the particles are loaded with attractants can vary in broad margins depending on the desired duration of effect of the arrangement according to the invention and the demanded attractant release rates. The particle load must merely suffice to maintain the saturation concentration of the attractant in the pressure-sensitive adhesive layer throughout the entire duration of application of the arrangement. Thus, the attractant content can lie between 0.1 and 90, preferably between 10 and 80 and especially between 30 and 60 wt-%. The desired concentration spans can be achieved by the person skilled in the art by varying the corresponding process parameters.

A further especially advantageous embodiment of the arrangement according to the invention is a trap in which the attractant is not enclosed in microparticles but rather adheres to their surface or the pores thereof and is released into the pressure-sensitive adhesive layer in the course of a desorption. In the present invention, these are described as composite particles. The arrangement according to the invention with microparticles of this kind is preferably employed in cases necessitating a relatively rapid beginning of action, e.g. for the eradication of already detected low density pest populations, as is often the case in private households. Especially pulverized inorganic substances can be named as basic materials or carriers which are suitable for this kind of surface loading. Several examples are: colloidal silicon dioxide (e.g. Aerosil® R 972), titanium dioxide ($TiO_2$), zinc oxide (ZnO), magnesium carbonate (MgCO3), calcium carbonate ($CaCO_3$), fatty acids such as stearic acid, palmitic acid, myristic acid or their metal salts, (aluminum stearate, magnesium stearate, calcium stearate, aluminum laurate), active carbon, talc and various clay minerals, whereby this is by no means a complete list. Of these substances, silicon dioxide is especially preferred due to its good availability and compatibility with pressure-sensitive materials of the trapping layer.

The physical-chemical characteristics of the attractant to be bound thereby determine the type of adsorbate to be employed. Especially in the case of fluid attractants, which are the most common, the degree of solid particle wetting depends on their surface characteristics. In the case of polar compounds, for example, hydrophilic AEROSIL® (e.g. AEROSIL® 300, AEROSIL®COK 84) is preferably employed, whereas hydrophobic types such as AEROSIL® R 972 or R 974 are employed in the case of apolar compounds.

Furthermore, numerous polymers can be employed as carrier materials for the surface binding of active substance. The prerequisite is that they are present in powder form with a dispersion of $\leq 100$ μm.

Suitable adsorbates, i.e. solids which can accumulate components of gaseous or fluid phases at their surface, are e.g. starch, kraft lignin, chitin as well as cellulose and its derivatives such as methyl cellulose, hydroxypropyl cellulose, hydroxyethyl cellulose, hydroxypropyl cellulose and carboxymethyl cellulose.

Similarly to the microcapsules, the particle size of the employed composite particles can lie between 1 and 100 μm, whereby the following principle is valid: the smaller the particle, the greater the interface and thus the adsorption capacity. The preferred particles have a particle diameter of $\leq 10$ μm.

Both types of microparticles can be produced according to state-of-the-art processes as described e.g. in the "Encyclopedia of Polymer Science", New York, 1968, Vol. 8.

The microencapsulation processes include e.g. coacervation, interfacial polymerization or interfacial polycondensation.

As is known, microparticles of the composite particles type are produced using impact force and/or frictional heat. Thus, they can be produced with the centrifugation process or according to the Wurster process using electrostatic charging. The choice of the production process is chiefly determined by the solubility characteristics of the attractants and the carrier substance.

Both pheromones and feeding stimulants can be used as attractants in the adhesive insect traps according to the present invention, whereby mixtures of both can also be employed. With reference to the first group, all known and synthetically produceable pheromones can be used. Several examples are: Z,E-9,12-tetradecadiene-1-ol, 14-methyl-1-octadecene, 9-tricosene, tridecenyl acetate, dodecyl acetate, dodecenyl acetate, dodecadienyl acetate, tetradecenyl acetate, tetradeca-dienyl acetate, hexadecenyl acetate, hexadecadienyl acetate, hexadecatrienyl acetate, octadecenyl acetate, octadecadienyl acetate, hexadecenal, octadecenal, Z13-icosen-10-on, 7,8-epoxy-2-methyloctadecane, and 8-methyl-2-decyl-propionate.

Examples for substances that can be used as feeding attractants are: amino acids and their derivatives, ethylene methylene glycidate, acetophenone, amyl acetate, isoamyl acetate, sugar syrup, vanillin, or coffee, fennel and cinnamon flavors.

Depending on the field of application, the attractant-containing pressure-sensitive adhesive layer can have different adhesive characteristics. Its characteristics profile, such as e.g. surface tackiness, total surface and odorlessness, can be adjusted according the type of insect to be caught, the weight and size of said insects and their moving technique.

Adhesives with a high immediate adhesiveness, to which even very small insects become stuck when they fleetingly touch the film surface, have turned out to be especially advantageous. Pressure-sensitive adhesive characteristics can be achieved by the person skilled in the art by means of a targeted choice of starting materials. Thus, pressure-sensitive adhesive polymers such as copolymerizates of acrylic acid and acrylic acid esters, especially acrylic acid alkyl esters such as 2-ethylhexyl acrylate or n-butyl acrylate, can be used as basis for the adhesive.

If using non-pressure-sensitive adhesive copolymerizates, such as polystyrene isoprene styrene, polystyrene butadiene styrene, polyethylene vinyl acetate and polyethylene acrylic acid ester, suitable auxiliary agents must be added to achieve the desired characteristics. These can especially be resinous materials, particularly colophony and its derivatives, polyterpene and hydrocarbon resins. Hereby, it is of essential importance that the adhesive remains substantially odorless even upon addition of tackifiers so that the baiting action of the attractants is not negatively influenced. With regard to this characteristic, HYDROGRAL®M and HYDROGRAL®MA (methyl resin esters of hydrated colophony) are here emphasized as being especially suited.

It is also important that the pressure-sensitive adhesive layer of the adhesive insect trap according to the invention maintains a good adhesiveness throughout the entire duration of application, extending over a period of several months. To achieve aging resistance of this layer, antioxidants such as butyl hydroxy toluene are used as additional auxiliary agents.

The surface of the particle-loaded trapping layer and thus the dimensions of the adhesive insect trap according to the invention depend on the desired attractant release profile, which in turn depends on the range of indications, e.g. the type of insect and the size and type of room in which the trap is to be applied.

The trap preferably consists of a flat-shaped substrate (mostly longitudinal strips) which is characterized by a foldable blank and can thus be formed into various bodies, e.g. prisms, right parallelepipeds, cubes or spheres.

This blank preferably has adhesive tabs, preferably pressure-sensitive adhesive ones, or tuck-in flaps so that it can be brought into its final form. Such foldable blanks offer the advantage that only small amounts of packaging material are needed for packaging and only a small amount of space is needed for transportation and storage.

In an especially advantageous embodiment of the adhesive insect trap according to the invention, the rear side of the carrier layer is equipped with a self-adhesive strip of arbitrary width to enable the fastening of the trap to vertical surfaces.

Depending on the application requirements, the insect trap according to the invention can be equipped with an eyelet for hanging.

The insect traps according to the invention are produced in a known manner in that pressure-sensitive adhesive masses containing attractant particles are applied onto suitable substrates and then, after film formation by means of cooling (in hot melt processes) or evaporation of the dispersant or solvent (in solvent processes), covered with protective materials. The thus produced laminates are subsequently divided into individual pieces in a cutting or punching process, and the thus resulting traps are packaged.

An especially advantageous embodiment of the insect trap according to the invention is a trap whose final embodiment is produced by the user by spreading or spraying the pressure-sensitive adhesive trapping layer onto the carrier of the arrangement as a flowable, attractant-particle-containing formulation immediately before use.

The insect trap according to the invention is employed for repelling or combating destructive insects. A preferred field of application is the repelling and control of food moths and cockroaches in indoor areas.

The invention is described in greater detail with the help of the following example:

EXAMPLE

In a temperature-controlled hot-melt container, pellets (20 weight units) of an ethylene-acrylic acid ester copolymerizate (LOTRYL 35 BA 40, product of ELF ATOCHEM) are melted at 120° C. with 36.4 weight units of a phthalic acid ester of technical hydroabietyl alcohol (CELLOLYN 21-E) and 20 weight units of a partially hydrated colophony ester (HERCOLYN D-E), and mixed until homogeneous. The thus obtained melt is cooled to 90° C. in steps of 4° C. under stirring.

3.6 weight units of Z,E-9,12-tetradecadien-1-yl acetate (sexual pheromone) encapsulated in polymethacrylate (EUDRAGIT L 30 D, Röhm Pharma) are slowly stirred into the melt, whereby the filling degree of the microcapsules was 42 wt-% and their average diameter was 12.5 $\mu$m. After a homogeneous distribution of particles is achieved in the melt, the particle-containing pressure-sensitive hot-melt adhesive is spread onto cardboard (Unistar 218, product of Weig) in a weight per unit area of 100 g/m$^2$ with a spreading knife; after cooling, a siliconized paper is laminated on. From the thus obtained laminate, rectangular pieces with a pressure-sensitive adhesive surface of 100 cm$^2$ (165×61 mm) are cut out which contain 15 mg of Z,E9,12-tetradecadien-1-yl acetate each. These are packaged in a side-sealed bag made of a gas-impermeable polyethylene terephthalate film (MELINEX, 30 $\mu$m).

What is claimed is:
1. An adhesive insect trap comprising a carrier layer; an attractant-containing pressure-sensitive adhesive trapping layer containing attractant-loaded microparticles acting as an attractant depot and having an appropriate release profile for long-term maintenance of a saturation concentration in said trapping layer; and a protective layer,
   wherein said attractant loaded microparticles are
      a) microparticles consisting essentially of polymeric matrix in which the attractant is homogeneously distributed, or
      b) inorganic or organic microparticles including surface or pores in which the attractant is adsorbed.
2. The adhesive insect trap of claim 1, wherein the polymeric matrix polymer is selected from the group consisting of polymerizates of acrylic acid alkyl esters, copolymerizates of methacrylic acid, and ethylcellulose.
3. The adhesive insect trap of claim 2, wherein the acrylic acid alkyl esters are selected from the group consisting of acrylic acid ethyl ester, acrylic acid isopropyl ester, acrylic acid n-butyl ester, acrylic acid n-hexyl ester and acrylic acid 2-ethylhexylester.
4. The adhesive insect trap of claim 1, wherein the inorganic microparticles are comprised of an inorganic substance selected from the group consisting of colloidal SiO$_2$, TiO$_2$, ZnO, Mg CO$_3$ CaCO$_3$, metal salts of stearic acid, palmitic acid or myristic acid, active carbon, clay minerals and talc.
5. The adhesive insect trap of claim 1, wherein the organic microparticles are comprised of a substance selected from the group consisting of starch, kraft lignin, chitin, cellulose and its derivatives.
6. The adhesive insect trap of claim 1 wherein said microparticles have a particle size of 1–100 $\mu$m.
7. The adhesive insect trap of claim 6 wherein the microparticles have a particle size of $\leq$10 $\mu$m.
8. The adhesive insect trap of claim 1 wherein a proportion of attractant-loaded microparticles in the trapping layer is 0.1–10.0 wt-%.
9. The adhesive insect trap of claim 1 wherein the attractant is pheromones or a feeding attractant.
10. The adhesive insect trap of claim 1 wherein the pheromone is selected from the group consisting of Z,E-9, 12-tetradecadiene-1-ol, 14-methyl-1-octadecene,9-tricosense, tridecenyl acetate, dodecyl acetate, dodecenyl acetate, dodecadienyl acetate, tetradecenyl acetate, tetradecadienyl acetate, hexadecenyl acetate, hexadecadienyl acetate, hexadecatrienyl acetate, octadecenyl acetate, octadecadienyl acetate, hexadecenal, octadecenal, Z13-icosen-10-on, 7, 8-epoxy-2-methyl octadecane, and 8-methyl-2-decyl-propionate, and/or that the feeding attractant is chosen from: amino acids and their derivatives, ethylene methylene glycidate, acetophenone, amyl acetate, isoamyl acetate, sugar syrup, vanillin, or coffee, fennel and cinnamon flavors.

11. The adhesive insect trap of claim 1 comprising a flat-shaped substrate which is formed into panels spheres, prisms, right parallelepipeds, cubes or other embodiments promoting the trapping of insects.

12. The adhesive insect trap of claim 1 wherein the carrier layer is equipped with elements facilitating the application of the trap.

13. The adhesive insect trap of claim 12 wherein said element facilitating the application of the trap comprises adhesive strips fixed to one side of the carrier layer.

14. A process for the in-situ production of an adhesive insect trap comprising applying to a carrier layer an attractant-containing pressure-sensitive adhesive layer which contains the attractant-loaded microparticles of claim 1 as a flowable formulation by means of spraying or spreading immediately prior to use.

15. A method for repelling or controlling insects comprising placing the adhesive insect trap of claim 1 in an environment with the insects.

16. The method of claim 15 wherein the insects to be repelled or controlled are food moths or cockroaches.

* * * * *